G. H. RABENALT.
APPARATUS FOR TREATING BATTERY PLATES.
APPLICATION FILED FEB. 6, 1913.
1,104,272.
Patented July 21, 1914.
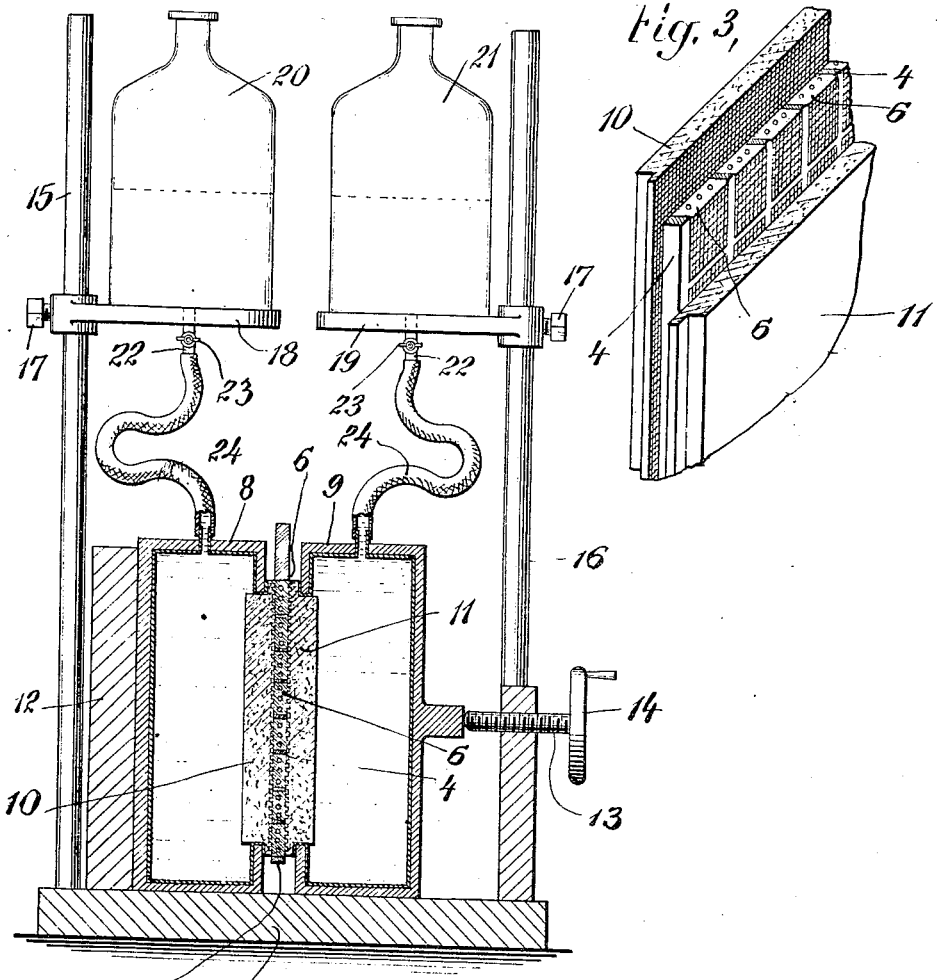
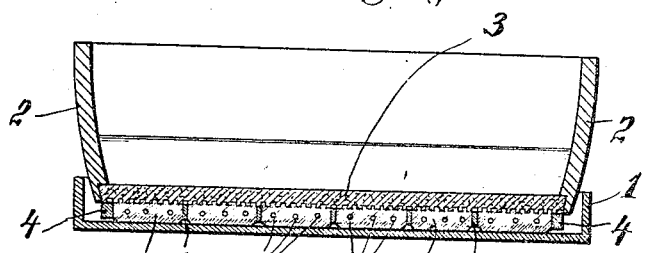

UNITED STATES PATENT OFFICE.

GUSTAV H. RABENALT, OF BUFFALO, NEW YORK, ASSIGNOR TO GOULD STORAGE BATTERY COMPANY, A CORPORATION OF NEW YORK.

APPARATUS FOR TREATING BATTERY-PLATES.

1,104,272. Specification of Letters Patent. Patented July 21, 1914.

Application filed February 6, 1913. Serial No. 746,483.

*To all whom it may concern:*

Be it known that I, GUSTAV H. RABENALT, a citizen of the United States, and a resident of Buffalo, county of Erie, and State of New York, have invented certain new and useful Improvements in Apparatus for Treating Battery-Plates, of which the following is a specification.

My invention relates to improvements in apparatus for treating battery plates, and more especially for increasing the active surface of pasted storage battery plates.

One object of the invention is to provide an arrangement embodying a die for roughening the surface of the active material of storage battery plates to increase the surface, and which arrangement will permit of the surface of the paste being set or hardened as by chemical action, while the die is still in engagement therewith.

Further objects, features and advantages will more clearly appear from the detailed description given below taken in connection with the accompanying sheet of drawings which forms a part of this specification.

In the drawings, Figure 1 is a section through an apparatus illustrating my invention in its broader aspects. Fig. 2 is a section through an apparatus illustrating my invention in a more improved form, and Fig. 3 shows in perspective a portion of the two dies with the intermediate plate of Fig. 2, the dies and plate being broken away at different heights.

Referring to Fig. 1, 1 represents a shallow dish made of any suitable material for holding sulfuric acid. 2 represents a second dish also designed to hold sulfuric acid so that its side walls are made of acid-resisting material. Set in the bottom of the dish 2 is a die 3 constructed of porous material capable of substantially resisting attack by sulfuric acid. I find that a material known as alundum is suitable for this purpose, and although I have used wood, any other porous material which is not too readily attacked by the reagent used in the dish 2 may be used. The lower face of the die 2 is roughened as by having a series of small grooves extending thereover.

In operation a battery plate (for instance, one composed of a grid having strengthening ribs 4 and intermediate conductors 5 of inactive material which carry and support the lead oxid paste 6) is laid on the bottom of the dish 1. Thereupon the dish 2 containing sulfuric acid is placed upon the battery plate and the die 3 forced into the top face of the paste of the plate so as to increase the surface of the paste to increase the active area thereof. While the die remains thus pressed into the paste and even as it is being pressed into the paste the sulfuric acid permeates through the pores of the die and attacks the paste, forming sulfate which causes the surface of the paste to harden or set so that after about a minute the dish 2 with its die 3 may be removed without any danger of it pulling any of the paste with it. The other side of the battery plate may then be treated in the same manner.

Referring to Figs. 2 and 3, I there illustrate an improved arrangement. The base 7 is adapted to support two containers 8 and 9, each being lead lined so as to be resistant to sulfuric acid. Each of the containers is open on one side and these open portions are closed by dies 10 and 11 respectively. Each of the dies 10 and 11 is made of porous material adapted to resist chemical attack by the contents of the containers, as already described in connection with the die 3. Each die 10 and 11 is also roughened on its outer face, as by being grooved or provided with irregular projections and indentations. The container 8 abuts against a fixed standard 12 while the container 9 is adapted to be moved toward the container 8 by means of a screw 13, and hand wheel 14.

Adjustably carried upon two upright standards 15 and 16, as by set screws 17, are two platforms 18 and 19. These platforms are adapted to carry large glass reservoirs 20 and 21 respectively. Each reservoir is provided with an outlet 22 in its bottom, each having a stop cock 23. Each outlet 22 is connected to one of the containers by a flexible rubber conduit 24, so that the reservoir 20 acts as means for supplying the paste-setting reagent to the container 8 and the reservoir 21 supplies it to the container 9.

In operation a pasted battery plate (for instance, one composed of a grid having strengthening ribs 4 and paste 6) is placed flat against the die 10. The container 9 with its die 11 is then moved toward the opposite side of the battery plate by means of the screw 13, so that both dies 10 and 11 are simultaneously forced into the opposite faces of the pasted plate to increase the area of the active surface thereof. Simultaneously with this, or before the dies have been removed from engagement with the paste the cocks 23 are opened, permitting the sulfuric acid in the containers 8 and 9 to pass through the pores of the dies under the head of pressure of the sulfuric acid in the reservoirs 20 and 21, so that the acid acts on the paste to set or harden both sides thereof at the same time by the formation of sulfate, whereby the dies may be removed in about a minute without danger of pulling the paste away with them. The cocks 23 being again closed, little or no further acid will pass through the dies, due to atmospheric back pressure. This sulfating action is preferably only allowed to act on the paste for a slight depth, it being found that after one or two minutes the setting has become sufficiently deep so that the dies may be removed. In this state the surface of the paste is firm or hard, with respect to the paste farther away from the surface. The amount of or rate of acid flowing through the dies may be regulated to regulate the speed and depth of set by changing the pressure head by adjusting the height of one or both of the reservoirs 20 and 21, each being adjusted to operate under a different pressure if desired, to compensate for differences in permeability of the porous dies. After this surface treatment by sulfating and increasing the effective area of the plate, the paste may be subjected to any further treatment the particular paste composition may require. Any other suitable reagent or means may be used for setting the surface of the paste so that the paste will not stick to the dies when they are removed, but it is important to my invention in its best form that the setting action occur while the die is still engaged with the paste. The containers 20 and 21, or dish 2, act as efficient and simple means for supplying the setting reagent to the dies, and cause it to pass through the pores thereof, and the dies being porous they form a simple and efficient means for conveying the reagent to the paste before the dies are removed, although other means may be used for this purpose if the setting action occurs while the dies are still engaged with the paste.

While I have described my improvements in great detail and with respect to certain particular embodiments thereof, I do not desire to be limited to such details except as clearly specified in the appended claims, since radical changes and modifications may well be made without departing from the spirit and scope of my invention in its broader aspects.

Having fully and clearly described my improvements, what I claim as new and desire to secure by Letters Patent, is:

1. The combination of two porous dies adapted to be applied to the opposite sides of a pasted battery plate respectively, and means for supplying a reagent to said dies and causing the reagent to pass through the pores of the dies to set or harden the paste.

2. In a device of the class described, a porous die adapted to be applied to the active surface of a pasted battery plate and means for supplying a reagent to said die and causing the reagent to pass through the pores of the die to set or harden the paste.

3. The combination of means for engaging a pasted battery plate on one side thereof, a container having a porous die in one face thereof adapted to be applied to the other side of the plate, and means for supplying to the container under pressure a reagent adapted to pass through the pores of the die and set the paste.

4. The combination of an acid proof porous die having a rough face adapted to be applied to the surface of a pasted battery plate to increase the active area thereof and means for supplying a reagent to said die and causing the reagent to pass through the pores of the die to set or harden the paste.

5. The combination of a die having a rough face adapted to be applied to the surface of a pasted battery plate to increase the active area thereof and means coöperating therewith for supplying a reagent to set or harden said surface while the die is engaged therewith.

6. Means for increasing the active area of pasted battery plates comprising a container for a reagent adapted to set the surface of the paste, said container having a porous die in one face thereof adapted to increase the active area of the paste and permit the reagent to pass therethrough and act upon said surface to set the same.

7. A device of the class described, comprising a liquid container, said container having in one face thereof a porous die with a rough face adapted to increase the active surface area of the battery plate substantially for the purposes described.

8. The combination of two containers each having a porous die in one face thereof adapted to engage the opposite sides of a pasted battery plate respectively, to increase the active area of the paste thereof, means for moving said containers relatively to one another to engage a pasted plate, means for supplying a reagent to said containers, under pressure, and varying the pressure under which said reagent is so supplied.

9. The combination of two containers each having a porous die in one face thereof adapted to engage the opposite sides of a pasted battery plate respectively, to increase the active area of the paste thereof, means for moving said containers relatively to one another to engage a pasted plate, means for supplying a reagent to said containers, under pressure, and varying the pressure under which said reagent is so supplied, said last mentioned means embracing two reservoirs, one for supplying each container respectively, and means for adjusting the height of said reservoirs independently of one another.

10. The combination of a container for a reagent for setting the surface of the paste of a battery plate, said container having a porous die in one face thereof for increasing the active area of the face of the plate, and means for varying the pressure of the liquid in the container upon said porous die.

11. The combination of a container for a reagent for setting the surface of the paste of a battery plate, said container having a porous die in one face thereof for increasing the active area of the face of the plate, and means for varying the pressure of the liquid in the container upon said porous die, said last mentioned means comprising a reservoir for the reagent, a flexible conduit connecting the reservoir with the container and means for adjusting the height of the reservoir with respect to the container.

12. In a device of the class described, the combination of two porous dies having each a face adapted to be applied to the surface of a pasted battery plate to increase the active area thereof, and means for forcing said dies together to engage a pasted plate to increase the active area of both sides of said plate simultaneously.

13. In a device of the class described, the combination of two dies having each a face adapted to be applied to the surface of a pasted battery plate to increase the active area thereof, means coöperating with said dies for supplying a reagent to set or harden the active surfaces of the plate while the dies are engaged therewith, and means for forcing said dies together to engage a pasted plate to increase the active area of both sides of said plate simultaneously.

14. In a device of the class described, the combination of two dies having each a face adapted to be applied to the surface of a pasted battery plate, means coöperating with said dies for supplying a reagent to set or harden the active surfaces of the plate while the dies are engaged therewith, and means for forcing said dies together to engage a pasted plate.

15. The combination of two porous walls through which a reagent is adapted to permeate to react with the paste of a battery plate to harden the paste, and means for forcing said two walls together to engage the opposite faces of a battery plate respectively.

16. A device for setting the surface of the paste of battery plates having a porous wall through which a reagent is adapted to permeate to set or harden the paste of the plate, and means for supplying the reagent to said porous wall under different pressures.

In testimony whereof, I have signed my name to this specification, in the presence of two subscribing witnesses.

GUSTAV H. RABENALT.

Witnesses:
  D. M. NOBLE,
  FRED. C. GEYER.